UNITED STATES PATENT OFFICE.

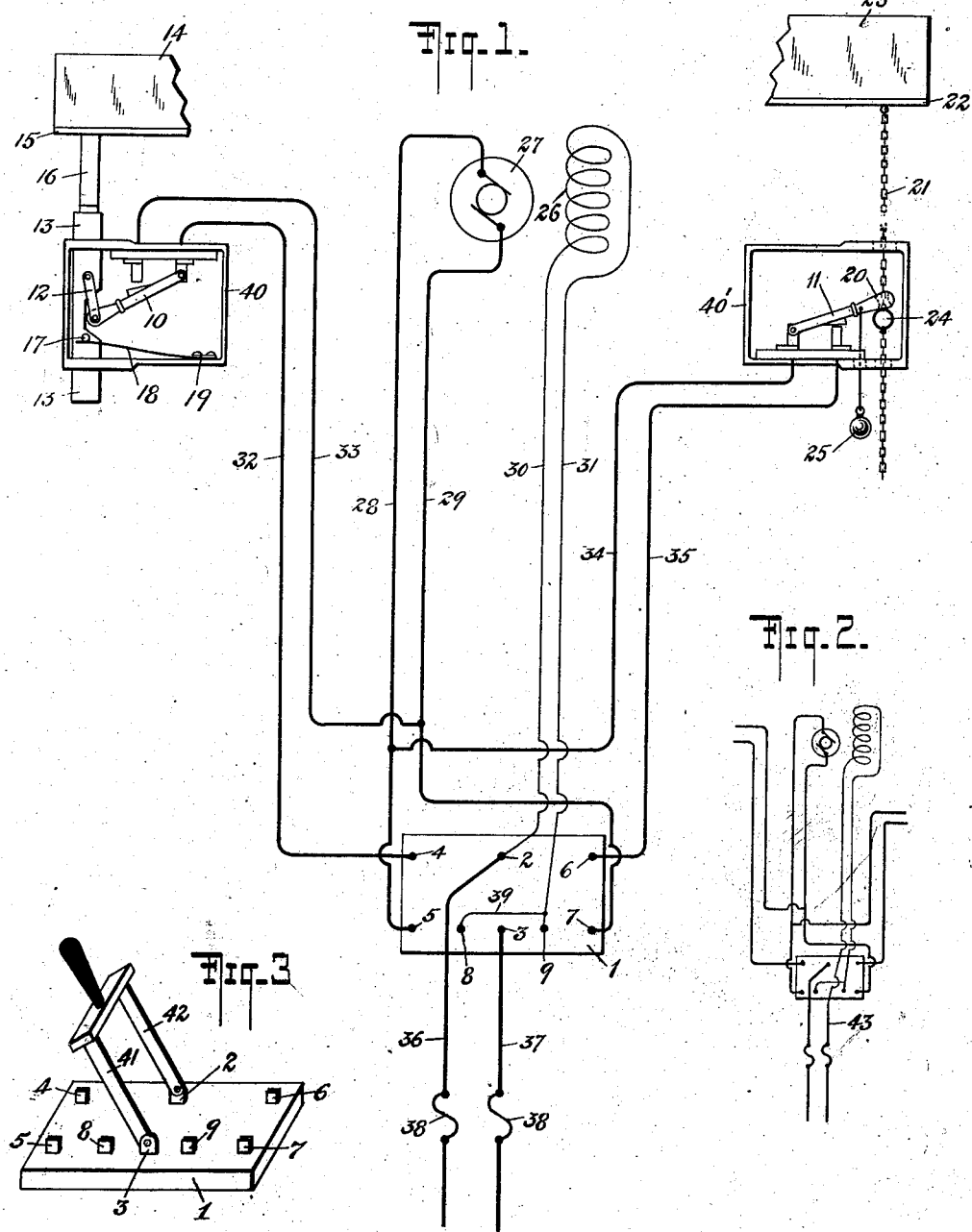

LESTER G. WILSON, OF LARCHMONT, NEW YORK.

ELECTRICAL CONTROLLING SYSTEM FOR ROLLING OR SLIDING SHUTTERS, ELEVATORS, &c.

939,650.  Specification of Letters Patent.  Patented Nov. 9, 1909.

Application filed May 23, 1908. Serial No. 434,520.

*To all whom it may concern:*

Be it known that I, LESTER G. WILSON, a resident of Larchmont, Westchester county, State of New York, have invented certain new and useful Improvements in Electrical Controlling Systems for Rolling or Sliding Shutters, Elevators, and Similarly-Moving Devices, of which the following is a specification.

My invention relates more particularly to that class of controls in which a shutter, elevator, or other device is required to operate between a certain two fixed limits and has for its object to provide an arrangement of electrical circuits, switches, and power transmitting mechanisms such that the starting of the moving device in either one of its directions of movement may be positively and simply controlled at any desired distance from the moving device itself and whereby such moving device, once started in its movement, will continue so to move until it reaches its predetermined limit where it will be automatically stopped.

The diagrammatic drawing, Figure 1, shows my invention as applied to the operation of a vertically moving metallic shutter driven, as to its motive power, by a shunt wound electric motor. A similar diagrammatic view, on a smaller scale, but showing only those parts which require to be changed when a series wound motor is substituted for a shunt wound motor, is given in Fig. 2. Fig. 3 is a perspective view of the main control switch shown diagrammatically in Fig. 1.

The operation of the shutter is controlled by the double pole, double throw, knife switch, 1, which has the usual terminal points 2, 3, 4, 5, 6 and 7, together with two extra terminal points, 8 and 9, lying between and in line with 3 and 5, and 3 and 7 respectively; electrical conductors or "mains," 36 and 37, protected by the usual fuses 38, 38, lead from a suitable source of electrical supply to points 2 and 3 of this switch. From switch points, 5 and 7, electrical conductors, 28 and 29, lead to the armature circuit, 27, of a suitable shunt wound electric motor of which the field circuit 26, is joined by electrical conductors, 30 and 31, to the switch points 2 and 9. Points 8 and 9, of the main switch are joined by a short conductor, 39. From switch points, 4, and conductor, 29, two conductors, 32, 33, are led to a single pole, single throw, knife switch, 10. This switch is joined by a link, 12, to a short bar, 13, having a small vertical range of movement in guides suitably formed in the box, 40, inclosing the switch.

14 is the broken off lower left hand corner of the shutter, (the latter shown as at its lower limit) to be controlled and 15 is a "bottom" or strengthening bar running along and attached to the lower edge of the shutter. Below this bottom bar, and attached to it, is a short vertical lug, 16, which moves, when the shutter moves, in a line prolonging the short bar, 13. In descending, therefore, when the shutter reaches its lower limit, the lug, 16, will press upon the bar, 13, and thereby open the switch 10. When the shutter rises switch 10 will be immediately closed again by the pressure of a spring, 18, attached to box 40 at 19, and acting upwardly on a pin, 17, fixed to the bar 13.

The broken off lower right hand corner of the shutter, with the latter at its upper limit or fully open, is represented by 23, with 22 as the "bottom" or strengthening bar. Attached to 22 is a chain, 21, (shown broken in the figure) hanging freely and passing through a hole, 20, in the handle of a single pole, single throw, knife switch, 11, inclosed in a suitable box, 40'. Upon the chain and below the hole, 20, is a ring, 24, of diameter too great to pass through the hole. As the shutter rises, therefore, carrying the chain with it, it will, when it reaches its upper limit, bring ring 24 against the underside of the handle of switch, 11, and open the switch. When the shutter descends, the chain, 21, and ring, 24, will drop and allow the weight, 25, hanging from switch, 11, to close the same.

From the terminals of switch 11, two conductors, 34 and 35, go to conductor, 28, and switch point, 6, respectively.

The motor armature, 27, should be connected mechanically with the shutter to be controlled by any suitable intermediate train of gears or belts such that the direction of the shutter will reverse with a reversal of direction of the armature rotation.

Suppose, now, the shutter, to be in its top or open position as shown by 23; switch 11 will then be open. Switch 10, however, will be closed since the curtain 14, (which is merely the left hand end of 23) will be up instead of down; suppose, also, that main switch 1, is open. To lower the shutter, switch 1 must be thrown to the left; the switch blade, 42, will then join points 2 and 4. while switch blade 41 will join points 5, 8, and 3, and, as may be readily traced out, a circuit will be completed from one main conductor, 36, e. g., through switch 10, motor armature, 27, and back to the other main conductor, 37; the field circuit, 26, of the motor will, as may be noted, be closed by way of 2, 30, 31, 39, 8, and 3 back to 37, thus placing it in parallel with the armature circuit, 27. Current flowing through this circuit will then cause the motor to function and hence the shutter to descend and this descent will continue uniformly until switch 10 in the armature circuit is opened by reason of the downward pressure of lug 16, upon the short bar, 13, as previously explained. By now opening the main switch, 1, the current through the field circuit 26, is also broken so that current is completely shut off from the motor. The shutter being now closed it may be raised, or opened, by throwing main switch, 1, to the right; switch blade 42 will then join 2 and 6, while switch blade 41 will join points 3, 9, and 7, and if the circuit be now traced out it will be found to be again complete from main conductor 36, through switch 11, (which was closed by the weight, 25, when the shutter was lowered), and through motor armature, 27, back to main conductor 37; the field circuit 26, of the motor will, as before, be in parallel with that of the armature, 27. But the current through the armature will now be in the reverse direction to that which obtained before when the shutter was being lowered, while the current through the field circuit will be in the same direction and, this being the condition for reversal of rotative direction of the motor armature, the shutter will now ascend instead of descend and will continue so to do until switch 11 is opened by the upward pull of chain, 21, and ring 24, thus again, breaking the armature circuit and stopping the motor. Opening switch 1 fully will again open the field circuit.

It should be observed that in operating main switch 1, by the construction of the switch, the armature circuit is always closed after the shunt or field circuit is closed and opened before the shunt or field circuit is opened. This is a necessary condition in shunt wound motors, as is well known, if risk of burning out the armature is to be avoided.

I may use a series motor in my system of control equally as well as a shunt motor with no change anywhere save a very slight one as regards two conductors, 30 and 37, one of the field leads and a main, respectively, which, for a series motor, are removed from main switch, 1, and connected together to form the conductor 43 of Fig. 3.

While I prefer to use my control for operating between two fixed limits I am not necessarily confined to such limits but may stop the shutter or other device at any point between such limits by merely opening the main switch, 1, and may either continue the movement later by again closing the switch in the same direction or may reverse the movement by closing the switch in the opposite direction.

Having now fully described my invention I claim—

In a system for operating and controlling a rolling metallic shutter adapted to be raised or lowered by an electric motor, in combination, a double pole double throw knife switch adapted to close either of two circuits each including the motor said switch being provided with extra contacts one of which is adapted to engage one of said switch blades when said switch is closed in either direction and said extra contacts being joined to one end of the field circuit of said motor; a normally closed single throw single pole knife switch in one of said independent circuits the handle of said switch being joined by a link to a bar adapted to be struck and moved vertically by the bottom bar of the shutter when fully closed thereby opening said circuit; and a normally closed single throw single pole knife switch in the other of said independent circuits the handle of said switch having a weight attached thereto adapted to hold said switch closed, said handle being further attached to a chain a remote end of which is attached above the switch to the bottom bar of the shutter so that as the shutter reaches the limit of its upward movement said switch is opened; substantially as and for the purpose described.

In testimony whereof I have hereunto set my hand and seal in the presence of two subscribing witnesses, this 20th day of May, 1908.

LESTER G. WILSON. [L. S.]

Witnesses:
HOWARD M. BOYD,
ELMER SHIRLYOUNG.